(12) United States Patent
Keenan et al.

(10) Patent No.: US 7,278,647 B1
(45) Date of Patent: Oct. 9, 2007

(54) MOTORCYCLE DOLLY

(76) Inventors: Benedict Keenan, 42-32 205th St., Bayside, NY (US) 11361; Mary Keenan, 42-32 205th St., Bayside, NY (US) 11361

( * ) Notice: Subject to any disclaimer, the term of this patent is extended or adjusted under 35 U.S.C. 154(b) by 0 days.

(21) Appl. No.: 11/143,977

(22) Filed: Jun. 3, 2005

(51) Int. Cl.
*B62B 3/00* (2006.01)

(52) U.S. Cl. .................. 280/79.11; 280/79.4; 414/426; 414/430

(58) Field of Classification Search ............... 414/430, 414/426; 188/29, 57; 280/79.11, 79.4
See application file for complete search history.

(56) References Cited

U.S. PATENT DOCUMENTS

| | | | | |
|---|---|---|---|---|
| 2,980,270 A | * | 4/1961 | Elliott et al. | 414/537 |
| 4,784,402 A | | 11/1988 | Roman | |
| 4,793,445 A | * | 12/1988 | Collignon et al. | 188/29 |
| 4,895,319 A | * | 1/1990 | Bardsen et al. | 244/115 |
| 4,901,647 A | | 2/1990 | Drabing | |
| RE34,433 E | * | 11/1993 | Heiligenthal et al. | 16/35 R |
| D349,993 S | | 8/1994 | Brand et al. | |
| 5,486,014 A | | 1/1996 | Hough | |
| 5,579,871 A | * | 12/1996 | Emmrich et al. | 188/19 |
| 5,609,461 A | * | 3/1997 | Lichtenberg | 414/426 |
| 6,095,746 A | | 8/2000 | Bergin | |
| 2003/0215313 A1 | * | 11/2003 | Hinkle | 414/426 |

* cited by examiner

*Primary Examiner*—Christopher P. Ellis
*Assistant Examiner*—John Walters

(57) ABSTRACT

A dolly includes a first platform that has a central longitudinal axis and monolithically formed outer and inner side portions extending outwardly and at an oblique angle therefrom. The side portions further extend along a length of the axis for retaining a motorcycle upon the first platform. Rectilinear arms have opposed ends wherein one end of each arm is conjoined to the first platform, and converges outwardly therefrom. A trapezoidal shaped second platform is spaced from the first platform and has a surface area less than a surface area of the first platform. The second platform is conjoined to another end of the arms such that the first and second platforms maintain a fixed spatial relationship. Coextensive casters are conjoined to the first and second platforms respectively. Mechanism is included for locking selected casters, preventing the dolly from freely articulating about a predetermined arcuate path.

15 Claims, 3 Drawing Sheets

MOTORCYCLE DOLLY

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to dollies and, more particularly, to a motorcycle dolly for assisting an operator in turning a motorcycle 180 degrees in tight places such that the direction of the motorcycle can be reversed.

2. Prior Art

Motorcycles, like automobiles, are commonly stored within garages. Generally the garage is of sufficient size to store both a motorcycle and an automobile. The motorcycle is normally maneuvered by the rider to a position alongside a sidewall of the garage so as to provide adequate room for the storage of the automobile. At times, it is difficult to maneuver a motorcycle to the desired location within the garage.

Some motorcycles are quite large in size and inherently quite heavy in weight. The maneuvering of such a large sized and heavy motorcycle is difficult for most individuals, especially for an individual who is not particularly strong. A variety of dolly constructions have been provided in the prior art for supporting and moving upright structures, such as vertical or upright pianos, a stack of boxes and the like. Such dollies have also been employed to facilitate the movement of large and cumbersome motorcycles.

Unfortunately, the motorcycle dollies provided in the prior art still have a number of critical shortcomings. One example shows a motorcycle dolly that is only capable of moving in forward and backward directions, but is not capable of rotational movement. This is inconvenient in the sense that a user is required to completely remove the motorcycle and dolly from the garage, dismount the motorcycle, and then has to return the dolly to the garage. Obviously, this is a time and energy consuming process.

A further disadvantage seen in the motorcycle dollies of the prior art is the fact that their wheels cannot be locked in place. Thus, should the dolly, with a motorcycle thereon, be stored at an incline, there is considerable risk for the dolly and motorcycle to roll and possibly tip over or hit other valuable objects, like a car, in the garage. Having no means to lock the wheels in place also increases the difficulty of mounting and dismounting the motorcycle onto and off of the dolly respectively.

Accordingly, a need remains for a motorcycle dolly in order to overcome the above-noted shortcomings. The present invention satisfies such a need by providing a motorcycle dolly that is convenient and easy to use, increases the user's safety, and provides protection to the motorcycle and other items stored in its vicinity. Such a motorcycle dolly allows a user to quickly turn the motorcycle 180° in confined spaces. This in turn saves the time and effort of the motorcycle owner, while also preventing possible muscle strains and fatigue. The ability to lock the wheels of the dolly in place greatly reduces the risk of same toppling over while holding a motorcycle thereon. Such a motorcycle dolly is reliable, easily adaptable to a variety of motorcycles, and attractively styled for appeal to a wide consumer base.

BRIEF SUMMARY OF THE INVENTION

In view of the foregoing background, it is therefore an object of the present invention to provide a motorcycle dolly. These and other objects, features, and advantages of the invention are provided by a rotatable motorcycle dolly for assisting an operator in turning a motorcycle 180 degrees in tight places such that the direction of the motorcycle can conveniently be reversed.

The dolly includes a first platform that has a centrally disposed longitudinal axis. Such a platform includes monolithically formed outer and inner side portions extending outwardly and at an oblique angle therefrom. The side portions further extend along a length of the axis for conveniently and effectively retaining a motorcycle upon the first platform. The first platform preferably has a textured top surface for effectively and conveniently maintaining frictional contact with a motorcycle and preventing slippage when torque is applied to the dolly.

A plurality of rectilinear arms has opposed end portions. One of the end portions of each arm is directly conjoined to the first platform and converges outwardly therefrom.

A second platform is spaced from the first platform and has a surface area less than a surface area of the first platform. Such a second platform is directly conjoined to another end portion of the arms such that the first and second platforms conveniently and effectively maintain a fixed spatial relationship during operating conditions. The second platform has a substantially trapezoidal shape.

A plurality of coextensive casters is directly conjoined to the first and second platforms respectively. Selected ones of the casters may be statically attached to the outer side portion and other ones of the casters may be statically attached to the inner side portion. The casters are fixed at predetermined oblique angles such that the dolly may conveniently be rotated 180 degrees for enabling a user to advantageously easily maneuver a stationary motorcycle. Further selected ones of the casters are preferably statically attached to the second platform and fixed at a predetermined oblique angle offset from a central latitudinal axis for effectively defining a turning radius.

The present invention preferably further includes mechanism for locking selected ones of the casters, advantageously preventing the dolly from freely articulating about a predetermined arcuate path. The locking mechanism includes first and second shafts including a plurality of brake pads directly conjoined thereto.

A pedal is pivotally and directly connected to the first and second shafts and is adjustable between locked and open positions. Such a first shaft extends orthogonal from the pedal and parallel to the axis. The second shaft extends orthogonal from the pedal and oppositely away from the first shaft such that the first and second shafts extend in axially opposed directions along the outer side portion of the first platform. The brake pads are positioned adjacent to selected ones of the casters and directly engage the selected casters for advantageously preventing rotation thereof when the pedal is pivoted to a locked position. Such brake pads are disengaged from the selected casters when the pedal is pivoted to an open position such that the selected casters are effectively allowed to rotate along the predetermined arcuate path.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
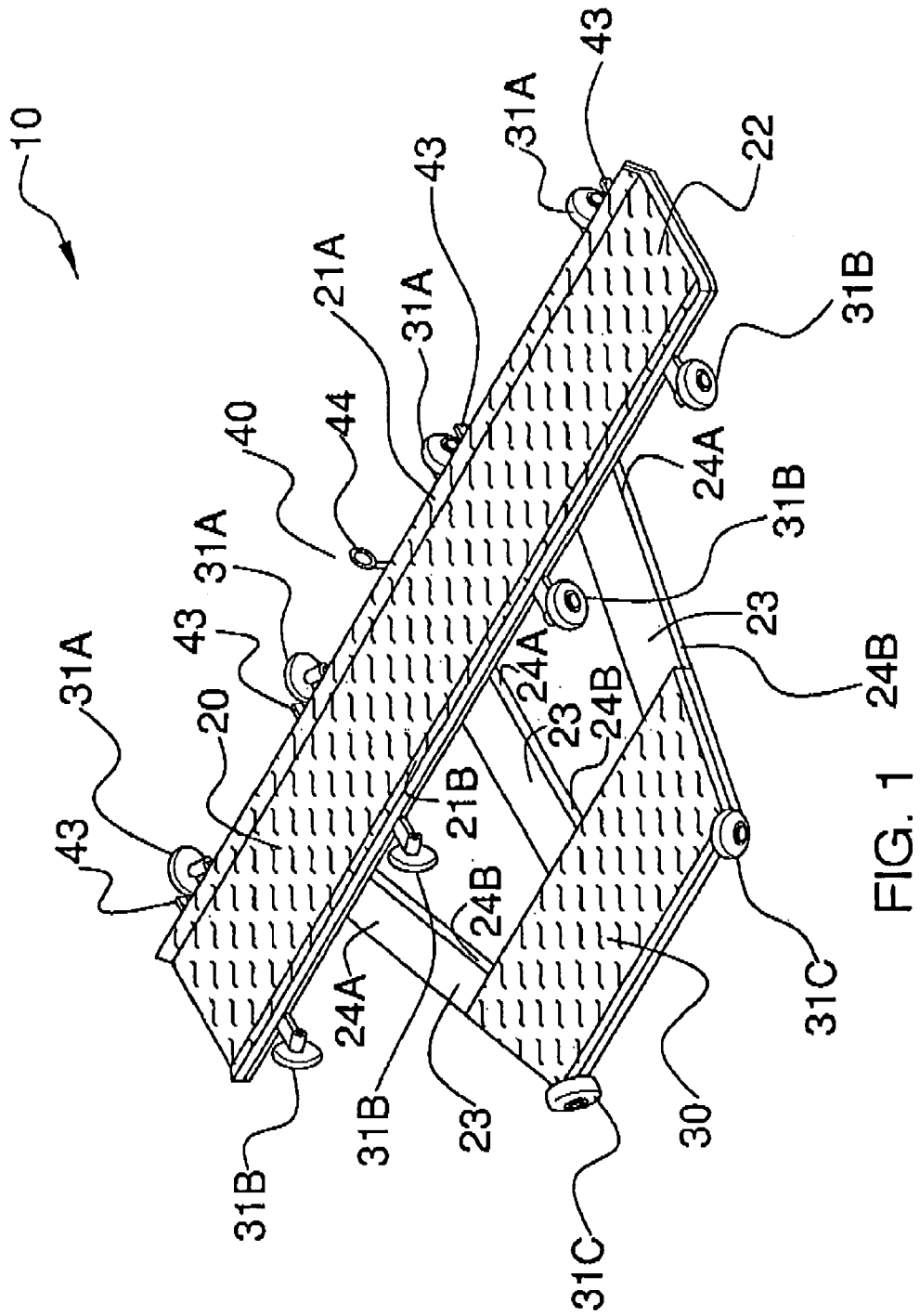
FIG. 1 is a perspective view showing a motorcycle dolly, in accordance with the present invention.
Figure 2:
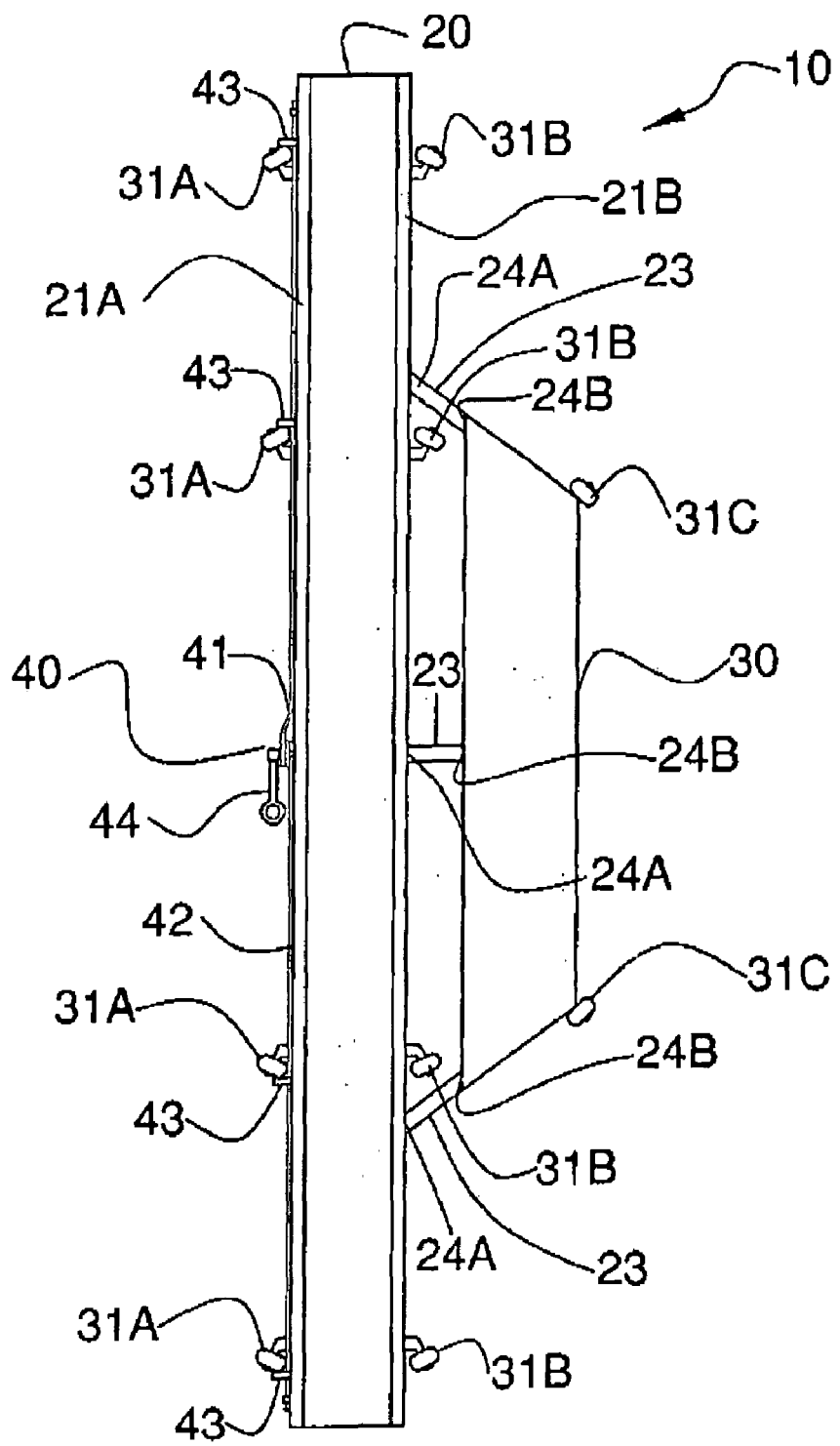
FIG. 2 is a bottom plan view of the assembly shown in FIG. 1.
Figure 3:
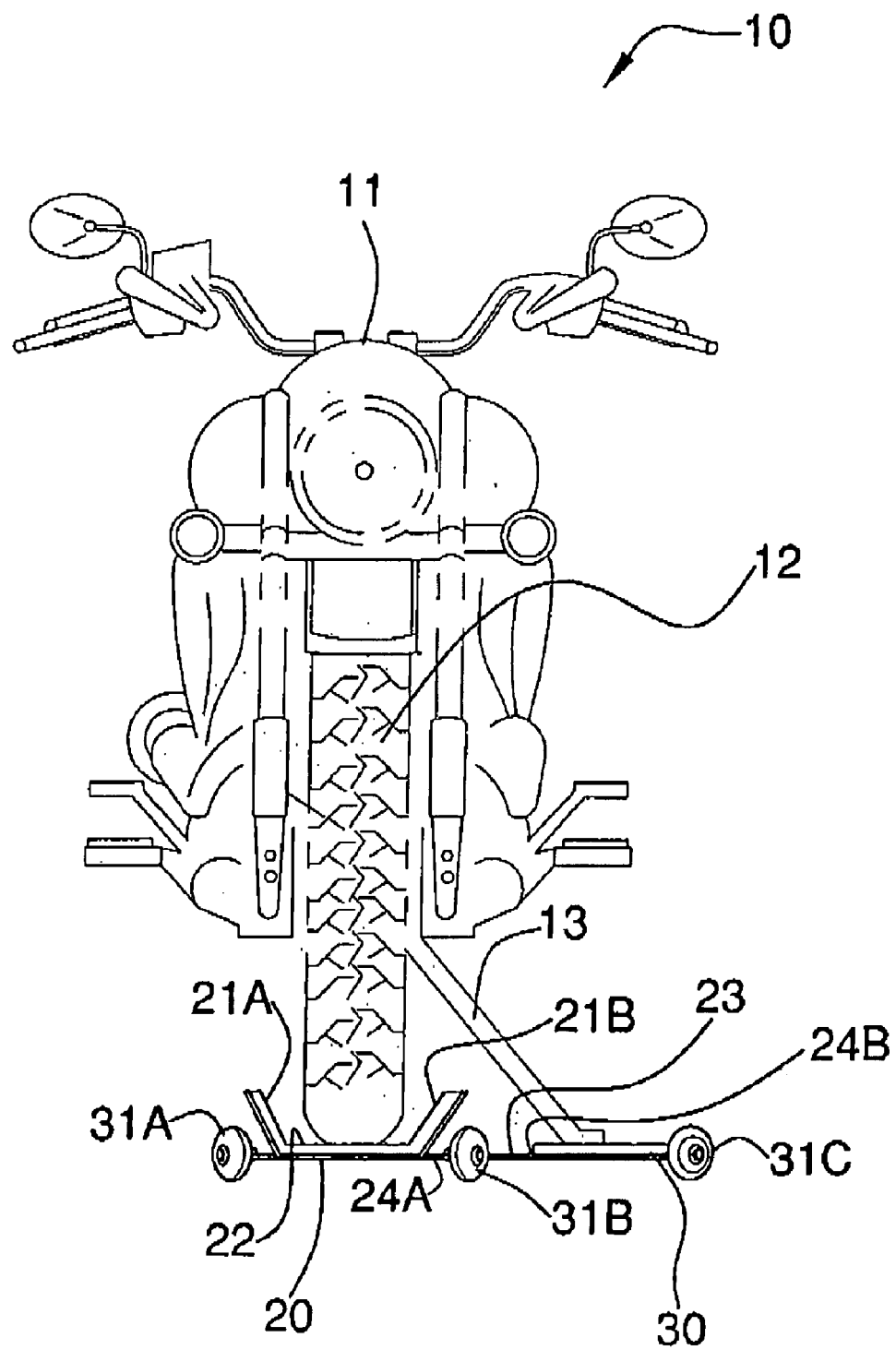
FIG. 3 is a front-elevational view of the assembly shown in FIG. 1, showing a motorcycle positioned thereon.

The assembly of this invention is referred to generally in FIGS. 1–3 by the reference numeral 10 and is intended to provide a motorcycle dolly. It should be understood that the assembly 10 may be used to support and rotate many different types of objects and structures and should not be limited in use to only supporting and rotating motorcycles.

Referring initially to FIGS. 1 and 2, the assembly 10 includes a first platform 20 that has a centrally disposed longitudinal axis. Such a platform 20 includes monolithically formed outer 21A and inner 21B side portions extending outwardly and at an oblique angle therefrom. The side portions 21 further extend along a length of the axis, which is essential for conveniently and effectively retaining a motorcycle 11 upon the first platform 20. The first platform 20 has a textured top surface 22 that is critical for effectively and conveniently maintaining frictional contact with a motorcycle 11 and preventing slippage when torque is applied to the dolly 10. This feature advantageously prevents the motorcycle 11 from toppling off of the dolly 10, which could result in serious injury to the user and damage to the motorcycle 11, respectively. Furthermore, a user can more easily mount and dismount a motorcycle 11 onto and off of the assembly 10 with the textured top surface 22, since the motorcycle's wheels 12 have improved grip compared to the grip on a smooth top surface.

Referring to FIGS. 1 through 3, a plurality of rectilinear arms 23 have opposed end portions 24. One of the end portions 24A of each arm 23 is directly conjoined, with no intervening elements, to the first platform 20 and converges outwardly therefrom.

Still referring to FIGS. 1 through 3, a second platform 30 is spaced from the first platform 20 and has a surface area less than a surface area of the first platform 20. Such a second platform is directly conjoined, with no intervening elements, to another end portion 24B of the arms 23, which is important such that the first 20 and second 30 platforms conveniently and effectively maintain a fixed spatial relationship during operating conditions. The second platform 30 has a substantially trapezoidal shape for allowing a support stand 13 of the motorcycle 11 to be conveniently supported thereon during operating conditions. Thus, the motorcycle 11 advantageously assumes a similar resting angle as when parked on the ground, which is vital for limiting the possibility of the motorcycle 11 tipping over. Of course, the second platform 30 may be produced in a variety of different shapes and sizes, as is obvious to a person of ordinary skill in the art.

Referring to FIGS. 1 and 2, a plurality of coextensive casters 31 are directly conjoined, with no intervening elements, to the first 20 and second 30 platforms respectively. Selected ones 31A of the casters 31 are statically attached to the outer side portion 21A and other ones 31B of the casters 31 are statically attached to the inner side portion 21B. The casters 31A, 31B are fixed at predetermined oblique angles, which is important such that the dolly 10 can conveniently be rotated 180 degrees for enabling a user to advantageously easily maneuver a stationary motorcycle 11 within an enclosed space. This feature conveniently allows a user to easily rotate and face the motorcycle 11 in an appropriate direction for exiting the storage area instead of having to exit in a reverse fashion. Further selected ones of the casters 31C are statically attached to the second platform 30 and fixed at a predetermined oblique angle offset from a central latitudinal axis that is vital for effectively defining a turning radius.

Still referring to FIGS. 1 and 2, the present invention further includes a mechanism 40 for locking selected ones of the casters 31, which is essential and advantageous for preventing the dolly 10 from freely articulating about a predetermined arcuate path. Thus, once the motorcycle 11 is loaded onto the assembly 10, a user can lock same in place and have peace of mind knowing that the assembly 10 will not roll and hit another object located in the vicinity thereof. The locking mechanism 40 includes first 41 and second 42 shafts including a plurality of brake pads 43 directly conjoined, with no intervening elements, thereto.

Again referring to FIGS. 1 and 2, a pedal 44 is pivotally and directly connected, with no intervening elements, to the first 41 and second 42 shafts and is adjustable between locked and open positions. The pedal can advantageously be used to engage and disengage the locking mechanism 40 with the user's foot, thus eliminating the need to bend up and down in order to do so, eliminating strain on a user's back. Such a first shaft 41 extends orthogonal from the pedal 44 and parallel to the axis.

The second shaft 42 extends orthogonal from the pedal 44 and oppositely away from the first shaft 41 such that the first and second shafts extend in axially opposed directions along the outer side portion 21A of the first platform 20. The brake pads 43 are positioned adjacent to selected ones of the casters 31A and directly engage, with no intervening elements, the selected casters 31, which is essential and advantageous for preventing rotation thereof when the pedal 44 is pivoted to a locked position. Such brake pads 43 are disengaged from the selected casters 31A when the pedal 44 is pivoted to an open position such that the selected casters 31A are effectively allowed to rotate along the predetermined arcuate path.

In use, the assembly 10 is positioned within a garage, shed or other storage area. Once positioned in a predetermined and desired location, a user can easily and safely pull the motorcycle 11 onto the assembly 10, which is further assisted by the locking mechanism 40 and the textured top surface 22 of the first platform 20. When use of the motorcycle is required again, the locking mechanism 40 is released, the entire assembly 10 is easily rotated a 180°, the locking mechanism is engaged again, and the motorcycle 11 is driven directly off of the assembly 10. Although the assembly 10 can be used with any motorcycle 11, it is particularly helpful with larger, heavier motorcycles 11.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A rotatable motorcycle dolly for assisting an operator in turning a motorcycle 180 degrees in tight places such that the direction of the motorcycle can be reversed, said dolly comprising:
    a first platform having a centrally disposed longitudinal axis, said platform including monolithically formed outer and inner side portions extending outwardly and at an oblique angle therefrom, said side portions further extending along a length of the axis for retaining a motorcycle upon said first platform;
    a plurality of rectilinear arms having opposed end portions, one said end portions of each said arms being directly conjoined to said first platform, said plurality of arms converging outwardly therefrom;
    a second platform spaced from said first platform and having a surface area less than a surface area of said first platform, said second platform being directly conjoined to another said end portion of said arms such that said first and second platforms maintains a fixed spatial relationship during operating conditions;
    a plurality of casters directly conjoined to said first and second platforms respectively; and
    means for locking selected ones of said casters and preventing said dolly from freely articulating about a predetermined arcuate path.

2. The dolly of claim 1, wherein said locking means comprises:
    first and second shafts including a plurality of brake pads directly conjoined thereto;
    a pedal pivotally connected to said first and second shafts and being adjustable between locked and open positions, said first shaft extending orthogonal from said pedal and parallel to the axis, said second shaft extending orthogonal from said pedal and oppositely away from said first shaft such that said first and second shafts extend in axially opposed directions along said outer side portion of said first platform;
    wherein said brake pads are positioned adjacent to selected ones of said casters and directly engage said selected casters for preventing rotation thereof when said pedal is pivoted to a locked position, said brake pads being disengaged from said selected casters when said pedal is pivoted to an open position such that said selected casters are allowed to rotate along the predetermined arcuate path.

3. The dolly of claim 1, wherein selected ones of said casters are statically attached to said outer side portion and other ones of said casters are statically attached to said inner side portion, said casters being fixed at predetermined oblique angles such that said dolly may be rotated 180 degrees for enabling a user to easily maneuver a stationary motorcycle.

4. The dolly of claim 1, wherein selected ones of said casters are statically attached to said second platform and fixed at a predetermined oblique angle offset from a central latitudinal axis for defining a turning radius.

5. The dolly of claim 1, wherein said first platform has a textured top surface for maintaining frictional contact with a motorcycle and preventing slippage when torque is applied to said dolly.

6. A rotatable motorcycle dolly for assisting an operator in turning a motorcycle 180 degrees in tight places such that the direction of the motorcycle can be reversed, said dolly comprising:
    a first platform having a centrally disposed longitudinal axis, said platform including monolithically formed outer and inner side portions extending outwardly and at an oblique angle therefrom, said side portions further extending along a length of the axis for retaining a motorcycle upon said first platform;
    a plurality of rectilinear arms having opposed end portions, one said end portions of each said arms being directly conjoined to said first platform, said plurality of arms converging outwardly therefrom;
    a second platform spaced from said first platform and having a surface area less than a surface area of said first platform, said second platform being directly conjoined to another said end portion of said arms such that said first and second platforms maintains a fixed spatial relationship during operating conditions;
    a plurality of coextensive casters directly conjoined to said first and second platforms respectively; and
    means for locking selected ones of said casters and preventing said dolly from freely articulating about a predetermined arcuate path.

7. The dolly of claim 6, wherein said locking means comprises:
    first and second shafts including a plurality of brake pads directly conjoined thereto;

a pedal pivotally connected to said first and second shafts and being adjustable between locked and open positions, said first shaft extending orthogonal from said pedal and parallel to the axis, said second shaft extending orthogonal from said pedal and oppositely away from said first shaft such that said first and second shafts extend in axially opposed directions along said outer side portion of said first platform;

wherein said brake pads are positioned adjacent to selected ones of said casters and directly engage said selected casters for preventing rotation thereof when said pedal is pivoted to a locked position, said brake pads being disengaged from said selected casters when said pedal is pivoted to an open position such that said selected casters are allowed to rotate along the predetermined arcuate path.

8. The dolly of claim 6, wherein selected ones of said casters are statically attached to said outer side portion and other ones of said casters are statically attached to said inner side portion, said casters being fixed at predetermined oblique angles such that said dolly may be rotated 180 degrees for enabling a user to easily maneuver a stationary motorcycle.

9. The dolly of claim 6, wherein selected ones of said casters are statically attached to said second platform and fixed at a predetermined oblique angle offset from a central latitudinal axis for defining a turning radius.

10. The dolly of claim 6, wherein said first platform has a textured top surface for maintaining frictional contact with a motorcycle and preventing slippage when torque is applied to said dolly.

11. A rotatable motorcycle dolly for assisting an operator in turning a motorcycle 180 degrees in tight places such that the direction of the motorcycle can be reversed, said dolly comprising:

a first platform having a centrally disposed longitudinal axis, said platform including monolithically formed outer and inner side portions extending outwardly and at an oblique angle therefrom, said side portions further extending along a length of the axis for retaining a motorcycle upon said first platform;

a plurality of rectilinear arms having opposed end portions, one said end portions of each said arms being directly conjoined to said first platform, said plurality of arms converging outwardly therefrom;

a second platform spaced from said first platform and having a surface area less than a surface area of said first platform, said second platform being directly conjoined to another said end portion of said arms such that said first and second platforms maintains a fixed spatial relationship during operating conditions; said second platform having a substantially trapezoidal shape;

a plurality of coextensive casters directly conjoined to said first and second platforms respectively; and means for locking selected ones of said casters and preventing said dolly from freely articulating about a predetermined arcuate path.

12. The dolly of claim 11, wherein said locking means comprises;

first and second shafts including a plurality of brake pads directly conjoined thereto;

a pedal pivotally connected to said first and second shafts and being adjustable between locked and open positions, said first shaft extending orthogonal from said pedal and parallel to the axis, said second shaft extending orthogonal from said pedal and oppositely away from said first shaft such that said first and second shafts extend in axially opposed directions along said outer side portion of said first platform;

wherein said brake pads are positioned adjacent to selected ones of said casters and directly engage said selected casters for preventing rotation thereof when said pedal is pivoted to a locked position, said brake pads being disengaged from said selected casters when said pedal is pivoted to an open position such that said selected casters are allowed to rotate along the predetermined arcuate path.

13. The dolly of claim 11, wherein selected ones of said casters are statically attached to said outer side portion and other ones of said casters are statically attached to said inner side portion, said casters being fixed at predetermined oblique angles such that said dolly may be rotated 180 degrees for enabling a user to easily maneuver a stationary motorcycle.

14. The dolly of claim 11, wherein selected ones of said casters are statically attached to said second platform and fixed at a predetermined oblique angle offset from a central latitudinal axis for defining a turning radius.

15. The dolly of claim 11, wherein said first platform has a textured top surface for maintaining frictional contact with a motorcycle and preventing slippage when torque is applied to said dolly.

* * * * *